(12) United States Patent
Izumo et al.

(10) Patent No.: US 8,067,705 B2
(45) Date of Patent: Nov. 29, 2011

(54) DRAFT SHIELD FOR A WEIGHING APPARATUS THAT HAS FRICTION REDUCTION PROTRUSIONS NEAR THE BOTTOM OF THE SLIDING DOORS TO ENGAGE THE TOP OF THE GUIDE GROOVES

(75) Inventors: Naoto Izumo, Kitamoto (JP); Hirosi Sigano, Kitamoto (JP); Satosi Suzaki, Kitamoto (JP)

(73) Assignee: A&D Company, Ltd, Tokyo (JP)

( * ) Notice: Subject to any disclaimer, the term of this patent is extended or adjusted under 35 U.S.C. 154(b) by 241 days.

(21) Appl. No.: 12/449,677

(22) PCT Filed: Feb. 4, 2008

(86) PCT No.: PCT/JP2008/051768
§ 371 (c)(1),
(2), (4) Date: Sep. 22, 2009

(87) PCT Pub. No.: WO2008/102634
PCT Pub. Date: Aug. 28, 2008

(65) Prior Publication Data
US 2010/0095598 A1    Apr. 22, 2010

(30) Foreign Application Priority Data
Feb. 23, 2007    (JP) .................... 2007/044096

(51) Int. Cl.
*E05D 15/06*    (2006.01)
*G01G 21/28*    (2006.01)

(52) U.S. Cl. ............ 177/180; 177/238; 49/404; 49/409; 49/411; 312/265.1

(58) Field of Classification Search .................. 177/180, 177/181, 238; 312/265.1–265.6; 361/725–727; 174/520; 49/404, 409–411
See application file for complete search history.

(56) References Cited

U.S. PATENT DOCUMENTS

| | | | | |
|---|---|---|---|---|
| 2,833,346 A | * | 5/1958 | Preston ......................... | 160/197 |
| 3,461,466 A | * | 8/1969 | Stahlhut et al. .................... | 4/557 |
| 3,500,481 A | * | 3/1970 | McKwane ......................... | 4/558 |
| 3,523,390 A | * | 8/1970 | McAulay, Jr ................... | 49/411 |
| 3,591,984 A | * | 7/1971 | Lauterbach ..................... | 49/220 |
| 3,653,157 A | * | 4/1972 | Casebolt ......................... | 49/411 |
| 3,787,936 A | * | 1/1974 | Rystad ............................ | 24/564 |
| 3,896,508 A | * | 7/1975 | Doan ............................... | 4/557 |
| 4,798,250 A | | 1/1989 | Knothe et al. | |
| 5,074,369 A | * | 12/1991 | Strickler ......................... | 177/180 |
| 5,152,356 A | * | 10/1992 | Strickler et al. .............. | 177/180 |
| 5,170,855 A | * | 12/1992 | Kunz et al. .................... | 177/181 |

(Continued)

FOREIGN PATENT DOCUMENTS

| | | |
|---|---|---|
| JP | 63-167218 | 7/1988 |
| JP | 7-025637 | 6/1995 |
| JP | 7-054820 | 12/1995 |

*Primary Examiner* — Randy W Gibson
(74) *Attorney, Agent, or Firm* — Jordan and Hamburg LLP

(57) ABSTRACT

A lower portion of a slide door of a windshield for a weighing apparatus is located in a guide groove of the main body of the windshield, along which guide groove the slide door opens and closes. A protrusion is protruded in a lower portion of the slide door and the protrusion engages an upper face of a frame in which the guide groove is formed. The protrusion supports weight of the slide door, and is slid on the upper face of the frame while the slide door does not come into contact with a bottom surface of the guide groove, thereby opening and closing the slide door.

5 Claims, 8 Drawing Sheets

U.S. PATENT DOCUMENTS

| | | | |
|---|---|---|---|
| 5,264,667 A * | 11/1993 | Luechinger et al. | 177/180 |
| 5,450,693 A * | 9/1995 | Tarrega | 49/411 |
| 5,874,694 A * | 2/1999 | Ruedisueli | 177/180 |
| 6,686,545 B2 * | 2/2004 | Luchinger et al. | 177/180 |
| 7,732,720 B2 * | 6/2010 | Olesen et al. | 177/180 |
| 7,923,648 B2 * | 4/2011 | Olesen et al. | 177/180 |

* cited by examiner

DRAFT SHIELD FOR A WEIGHING APPARATUS THAT HAS FRICTION REDUCTION PROTRUSIONS NEAR THE BOTTOM OF THE SLIDING DOORS TO ENGAGE THE TOP OF THE GUIDE GROOVES

BACKGROUND OF THE INVENTION

The present invention relates to a windshield for a weighing apparatus such as an electronic scale, and particularly to a windshield including a sliding door in a windshield side portion.

In a weighing apparatus, so-called electronic scales including an electromagnetic balancing type weighing apparatus that is called an electronic balance and a high-precision load cell type scale can measure a micro mass, while the electronic scales are largely affected by disturbance. One of the disturbances is airflow around a pan on which a measurement target is placed.

For example, airflow from an air conditioner, human breath during the measurement, and airflow generated by human walk act as a wind pressure on a weight-bearing portion centered on the pan, and the pan is affected by a so-called blast of the wind pressure, which results in an unstable measurement value and a measurement error. Therefore, a windshield that covers the weight-bearing portion centered on the pan is used not only in a high-precision electronic scale called an analytical balance having a minimum scale of about 0.1 mg but also in a model commonly called a general-purpose balance whose minimum scale ranges from about 0.01 g to about 0.001 g.

For the analytical balance, because the windshield is an element necessary to accurately measure a weight, the windshield is formed as part of the electronic scale, that is, the windshield is integral with the electronic scale main body. On the other hand, for the general-purpose balance, frequently the detachable windshield that is formed independently of the electronic scale main body is used in the electronic scale if needed.

In the analytical balance, the windshield integral with the electronic scale main body has an opening and closing portion (hereinafter referred to as "door") in right and left portions or an upper portion of the windshield, and good usability is achieved. However, the windshield portion becomes inevitably large and complicated because a frame and a door sliding portion are formed to ensure the opening and closing of the door. Frequently the detachable windshield has a structure simpler than that of the integrated windshield because of demand for light weight and low cost, and it is recognized that the detachable windshield is inevitably inferior in usability to the integrated windshield.

In the future, it is believed that the high-precision measurement is increasingly demanded not only in the analytical balance but also in the general-purpose balance. Therefore, the necessity of the windshield is increased in the whole electronic scale.

In a basic configuration of the windshield, frequently the door is formed in a windshield side portion in order to open the inside of the windshield. The whole shape of the integrated windshield frequently used in the analytical balance is often formed into a square shape such as a rectangular solid or a cubic by a flat plate such as a plate glass. In the square-shape windshield, the glass plate constituting the windshield side plate is slid in a front-back direction of the windshield to open and close the windshield.

Generally the square-shape windshield has the good operability. However, because the sliding windshield side plate is moved backward in opening the windshield, a space is required to move the windshield side plate in a rear portion of the windshield, which enlarges the configuration of the windshield. Therefore, because a weighing mechanism chamber or a board placement space is previously provided at the back of the windshield, the sliding door configuration is adopted only in the weighing apparatus such as the analytical balance having the integrated windshield in which the space can be used as a windshield side plate storage space.

One of vertical side edges of the windshield side plate is connected to the windshield main body by a hinge, and the windshield side plate is turned about the hinge to open and close the side plate, whereby the windshield side plate storage space is eliminated in opening and closing the door. However, when the door is opened and closed by turning the side plate about the hinge, a large wind pressure is generated in a space near the pan, where airflow should be avoided. Therefore, the configuration becomes countercurrent against the original purpose of the windshield, and the configuration cannot be used as the opening and closing mechanism of the windshield for a weighing apparatus.

In view of the foregoing, the whole of the windshield is formed into a substantially cylindrical shape, and at least part of a cylindrical side portion of the windshield is rotated about a cylindrical shaft center of the windshield. At this point, because the rotating portion is moved only on a circle that is a cylindrical projection, it is not necessary to provide the storage space at the back of the windshield in opening the windshield. This enables the windshield to be miniaturized.

The door is not opened and closed by turning the side plate about the hinge, but the door is opened and closed by the sliding operation. Therefore the door can sufficiently act as the windshield while the particular wind pressure is not generated in opening and closing the door.

From this standpoint, some proposals of the substantially cylindrical windshield have been made as follows:

Patent Document 1: Japanese Utility Model Application Laid-Open No. 7-054820

Patent Document 2: U.S. Pat. No. 4,798,250

SUMMARY OF THE INVENTION

A windshield described in Patent Document 1 is formed as a windshield that is integral with an electronic scale main body, and a windshield described in Patent Document 2 is formed as a detachable windshield that is formed independently of the electronic scale main body.

In the windshield described in Patent Document 1, part of the cylindrical sidewall is opened and closed as the slide door. In the windshield described in Patent Document 2, the whole of the windshield is formed into the substantially cylindrical shape, the cylindrical shape is divided into two in the cylindrical shaft center direction, and inner diameters of the semicylindrical portions are set such that one of the semicylindrical portions can be located inside the other semicylindrical portion, thereby relatively rotating the semicylindrical portions to open and close the windshield.

This configuration has the advantage as described above. At the same time, because the configuration has the following technical problem, the windshield has not become widespread as a product.

In the windshields described in Patent Documents 1 and 2, the opening and closing portion is part of the cylinder, and the part of the cylinder is slid in a slide groove formed into a circular shape in plane on the weighing apparatus main body side, thereby performing the windshield opening and closing operation. That is, the circular opening and closing portion performs the sliding operation along the circular slide passage (slide groove).

In the windshields described in Patent Documents 1 and 2, high roundness is required for both the slide passage and the opening and closing portion. When at least one of the slide passage and the opening and closing portion has the low roundness, the opening and closing portion scrubs the slide groove to generate an abnormal noise in sliding operation, or the opening and closing are not smoothly performed, and the opening and closing operation cannot be performed in some instances. Particularly, in the windshield described in Patent Document 2, because the inner diameters of the semicylinders are different from each other, it is necessary to prepare two slide grooves, and to improve the roundness in all the semicylindrical portions and slide grooves.

However, actually there is a limitation to the improvement of the roundness in both the cylindrical portion on the windshield side and the slide groove on the weighing apparatus side. In order to avoid the problem, a width of the slide groove is formed larger than a thickness of the opening and closing portion to form a given clearance between the slide groove and the opening and closing portion. Therefore, the clearance can suppress the roundness to some extent in both the cylindrical portion and the slide groove. On the contrary, rattle is generated during the opening and closing operation due to the clearance, or the opening and closing operation is not smoothly performed due to the clearance.

Obviously the whole of the lower end edge of the opening and closing portion is slid in the slide groove while being in contact with the slide groove in opening and closing the windshield. When the dust and sand grain invade into the slide groove, therefore, unfortunately a sliding resistance is increased to hardly open and close the windshield or a contact surface between the opening and closing portion and the slide groove is abraded to hardly open and close the windshield by the dust and sand grain. Even if the roundness is ensured, an unavoidable situation is generated to some extent in the practical use of the electronic scale such that the sample of the measuring target falls in the slide groove or such that the dust invades in the slide groove, which conventionally becomes a large problem in the site where the scale is used.

The invention has been made in view of the above-described circumstances.

Irrespective of the detachable windshield and the fixed windshield, a windshield for a weighing apparatus according to an aspect of the invention, which is formed into a substantially cylindrical shape, is characterized in that part of the cylindrical sidewall is formed as a slide door, upper and lower end edges of the slide door are moved along the guide grooves formed in frames disposed above and below the slide door, a protrusion that is protruded in a wall-thickness direction of the slide door is formed in a neighborhood of at least the lower end edge in the upper and lower end edges of the slide door, the protrusion is engaged with the plane portion at the upper end of the guide groove to support a weight of the slide door lower end edge, thereby separating the lower end edge of the slide door from the bottom surface of the guide groove, and the protrusion is in contact with and slid on the plane portion at the upper end of the guide groove to open and close the slide door.

The protrusion of the slide door comes into contact only with the plane portion at the upper end of the guide groove, and the lower end edge of the slide door and the bottom surface of the guide groove are not in contact with each other. Therefore, compared with the conventional configuration in which the whole lower end edge of the slide door is in contact with the bottom surface of the guide groove, a sliding resistance is largely reduced in opening and closing the slide door, so that the slide door can smoothly be opened and closed.

Even if the dust, sand grain, or sample fallen during measurement invades the guide groove, the slide door and the guide groove are not directly in contact with each other, and the slide door is not directly slid on the guide groove. Therefore, the abrasion is hardly generated between the slide door and the guide groove, and the slide door can smoothly be opened and closed for a long time.

BRIEF DESCRIPTION OF THE DRAWINGS

FIG. 3(A) is a plan view of the slide door, FIG. 3(B) is a front view of the slide door, FIGS. 3(C) and 3(D) are side views of the slide door, FIG. 3(E) is a bottom view of the slide door, and FIG. 3(F) is a perspective view of the slide door.

DETAILED DESCRIPTION OF THE INVENTION

At least slide doors and upper and lower frames retaining the slide doors are made of a synthetic resin, particularly a protrusion and a door opening and closing grip of the slide door are integrally made of a transparent resin such as an acrylic resin. The acrylic resin is light, and the slide door is slid while only the protrusion comes into contact with the frame side having the guide groove, so that slide door opening and closing operation can extremely smoothly be performed.

First Embodiment

Figure 1:
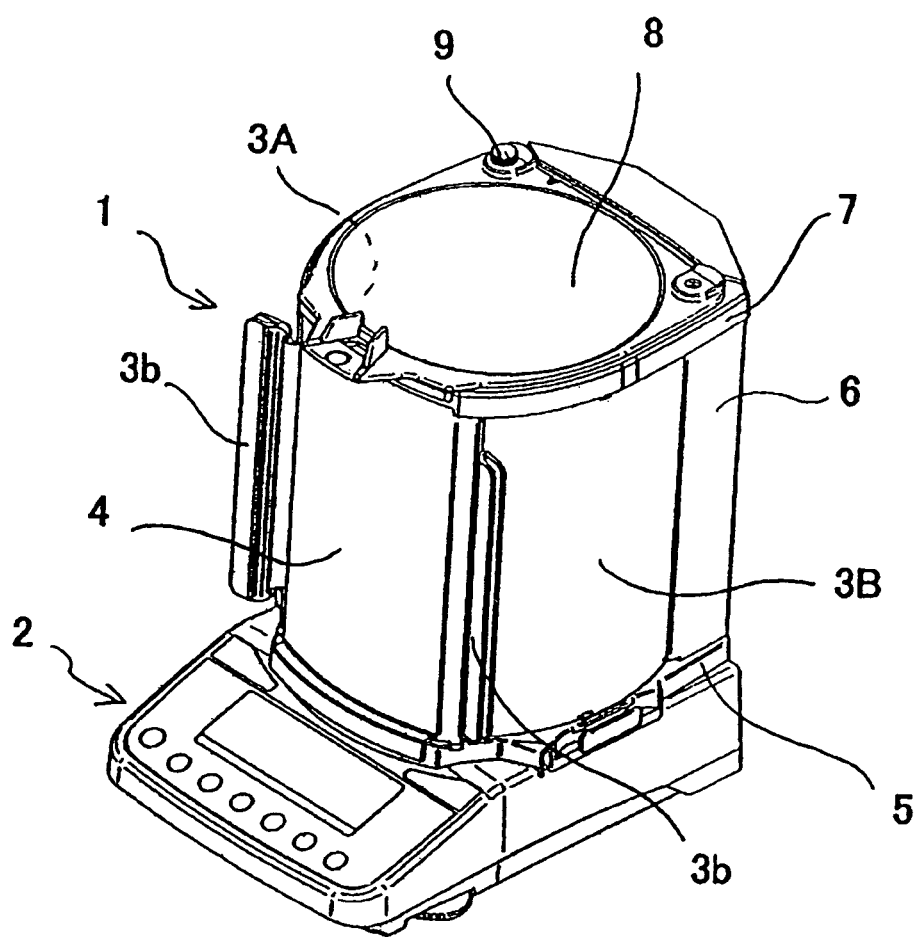
FIG. 1 is a perspective view illustrating an electronic scale in which a windshield according to an embodiment of the invention is provided.
Figure 2:
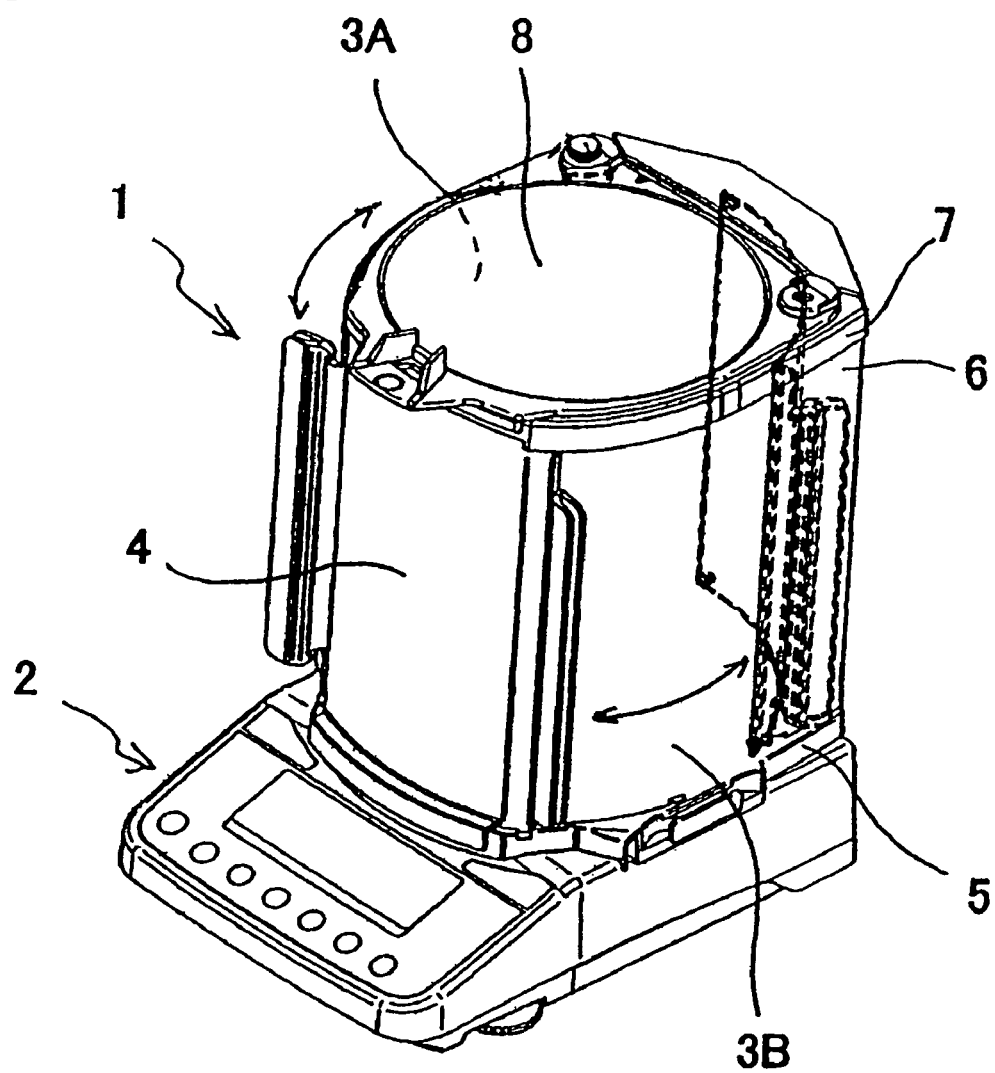
FIG. 2 is a perspective view illustrating a state in which slide doors of the windshield of FIG. 1 are opened and closed.

Referring to FIGS. 1 and 2, the numeral 1 designates a windshield main body, and the windshield main body 1 is detachably attached to an electronic scale main body 2. However, description of an attaching and detaching mechanism is omitted, because the attaching and detaching mechanism is not a constituent of the invention. A windshield for a weighing apparatus according to an embodiment of the invention will be described below. However, the windshield for a weighing apparatus of the invention can be applied to both the detachable windshield and the integrated windshield.

In the windshield main body 1, the numerals 3A and 3B designate right and left slide doors 3 constituting part of the windshield main body 1, respectively. The slide door 3 on the left side of the windshield main body 1 is referred to as left slide door 3A and the slide door 3 on the right side is referred to as right slide door 3B.

The numeral 5 designates a lower frame member constituting part of the windshield main body 1, the numeral 7 designates an upper frame member, and the numeral 6 designates a rear frame member that couples the upper and lower frame members 7 and 5. As described in detail below, the right and left slide doors 3A and 3B are opened and closed along guide grooves formed in the upper and lower frame members 7 and 5.

The numeral 4 designates a front fixed panel (hereinafter simply referred to as "fixed panel"), and upper and lower end portions of the fixed panel 4 are fitted in the upper and lower frame members 7 and 5 to fix the fixed panel 4 in a central front position of the windshield main body 1 as illustrated in FIGS. 1 and 2. The numeral 8 designates an upper door, and an upper space is opened and closed by turning the upper door 8 about a screw 9 attached to the upper frame member 7. The substantially cylindrical windshield main body 1 includes the upper and lower frame members 7 and 5, the rear frame member 6, the right and left slide doors 3A and 3B and fixed panel 4 that are sandwiched between or supported by the frame members 5, 6, and 7, and the upper door 8 that is provided in the upper frame member 7.

Figure 3:
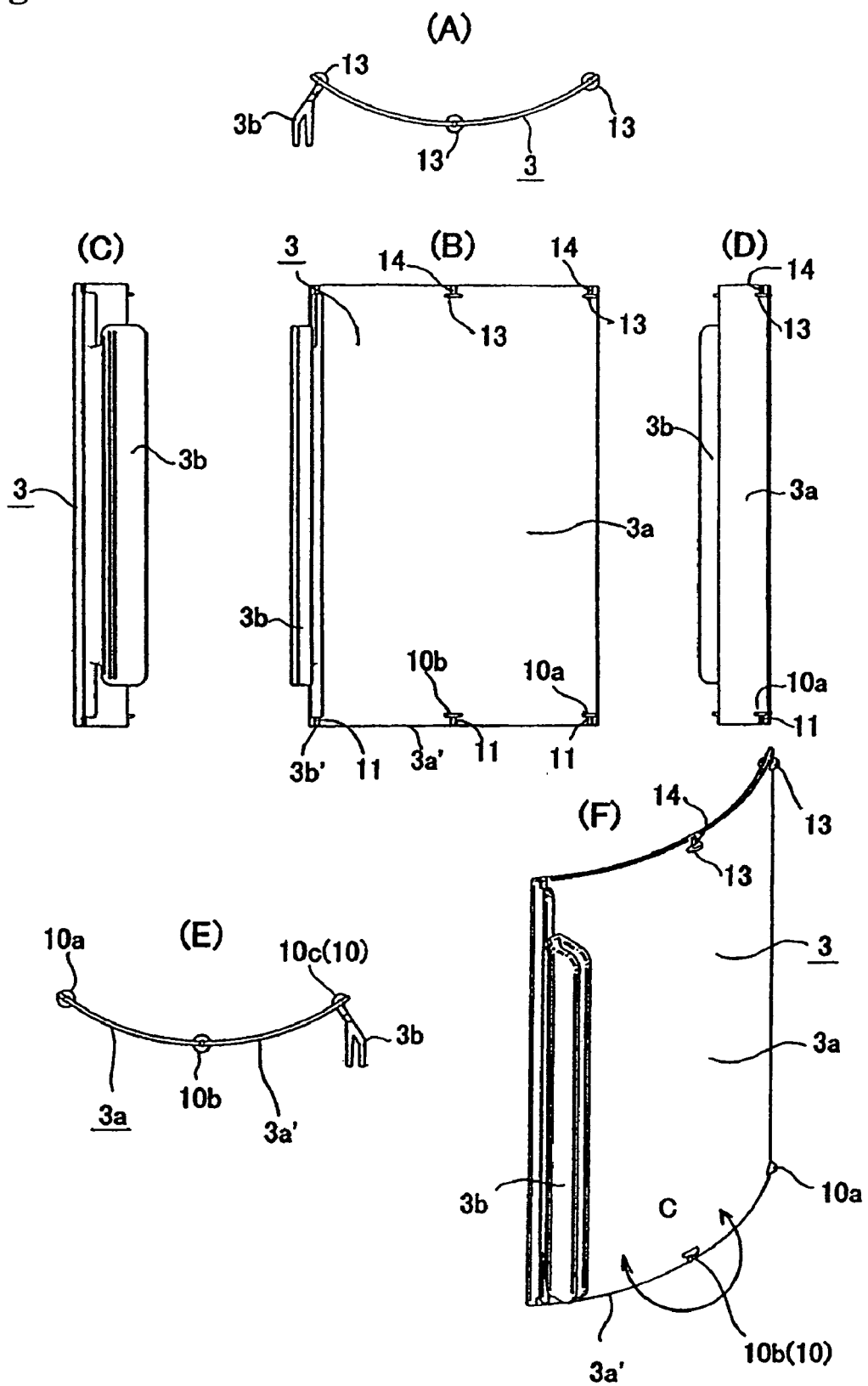
FIG. 3 illustrates a configuration of the slide door.

FIG. 3 illustrates a configuration of the slide door 3. Although FIG. 3 illustrates the configuration of the right slide door 3B, the left slide door 3A and the right slide door 3B have the symmetrical configuration. The left slide door 3B will be described below by way of example. Because the right and left slide doors 3A and 3B have the symmetrical configurations, the left slide door 3B will be described as the slide door 3 unless the right and left slide doors are particularly specified in FIG. 3.

FIG. 3(A) is a plan view of the slide door 3, FIG. 3(B) is a front view of the slide door 3, FIGS. 3(C) and 3(D) are right and left side views of the slide door 3, FIG. 3(E) is a bottom view of the slide door 3, and FIG. 3(F) is a perspective view of the slide door 3.

The slide door 3 is molded by the synthetic resin such as the acrylic resin while being integral with later-described portions. The numeral 3a designates a main body of the slide door 3. As illustrated in FIG. 3, the slide door main body 3a constitutes a side portion of the cylindrical windshield main body 1, and is formed into a curved surface such that a projection of a bottom surface of the slide door main body 3a draws an arc. The numeral 3b designates a slide door opening and closing grip that is integral with the slide door main body 3a.

The numeral 10 designates a slide door supporting protrusion that is projected from an inner surface and an outer surface of the slide door main body 3a in a neighborhood of a lower end edge 3a' of the slide door main body 3a. The protrusions are formed at plural points in a sliding direction of the slide door main body 3a. The numerals 10a, 10b, and 10c designate the protrusions 10 that are formed at positions of the slide door 3a.

Figure 4:
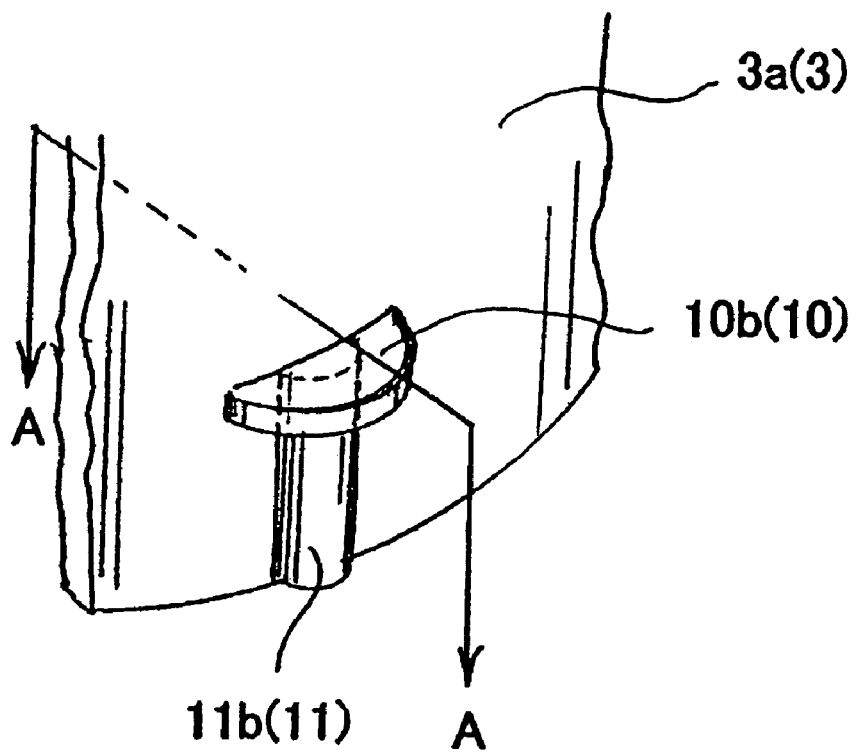
FIG. 4 is a partially enlarged view illustrating a C portion of FIG. 3(F).

In the configuration of FIG. 4, the protrusion 10 is formed into a substantially semi-circular shape in both the inner surface and the outer surface of the slide door main body 3a. However, as described later, the protrusion 10 supports a weight of the slide door 3, and is used to smoothly open and close the slide door 3. Therefore, the protrusion 10 may have any shape as long as the function of the protrusion 10 is performed.

Figure 5:
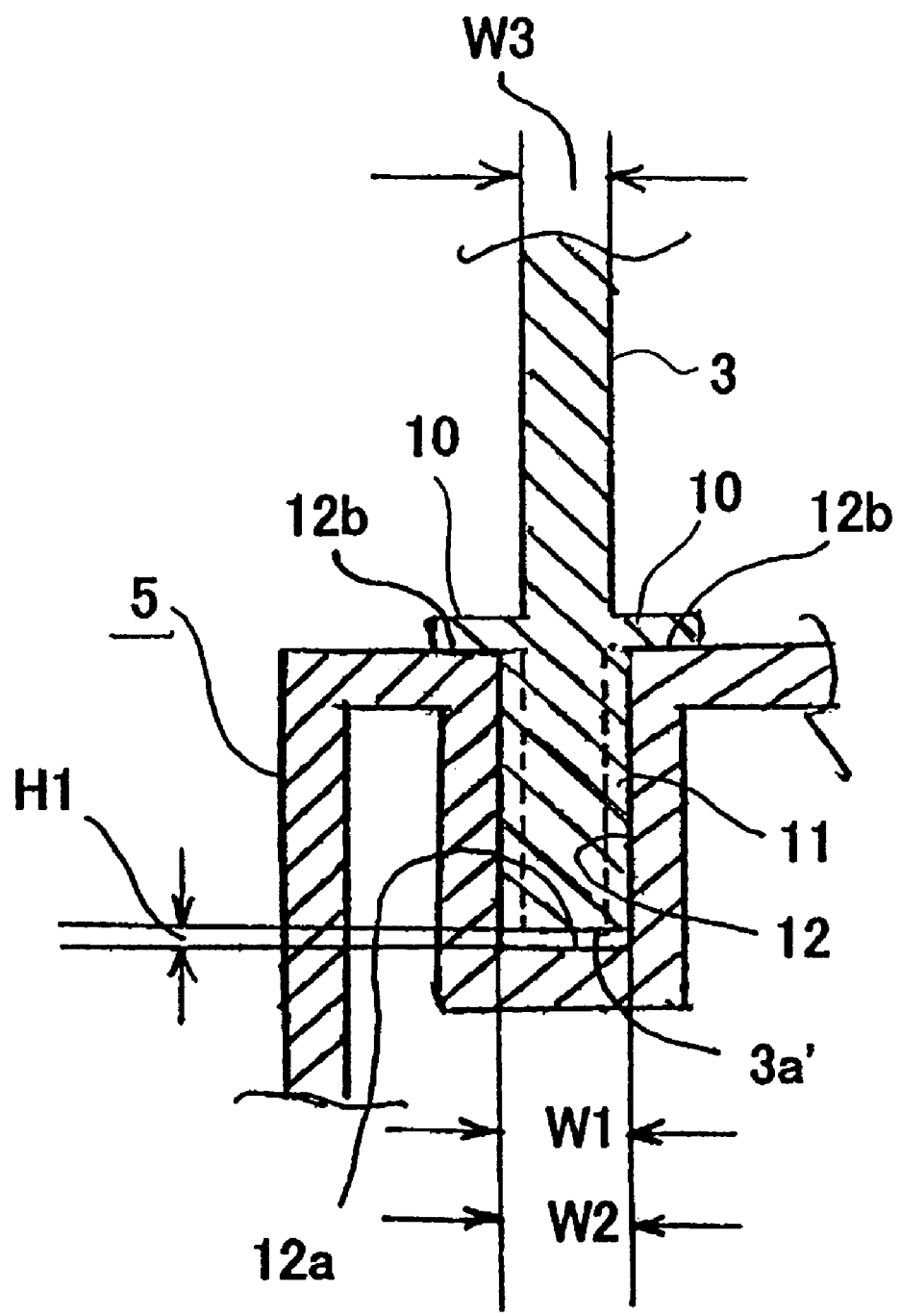
FIG. 5 is a sectional view illustrating a state in which a slide door section taken on a line A-A of FIG. 4 is engaged with a guide groove section taken on a line B-B of FIG. 6.

The numeral 11 designates a thick-wall portion that is projected from both surfaces of the slide door main body 3a in the lower portion of the protrusion 10. In the configuration of FIG. 4, the thick-wall portion 11 is formed into a semicylindrical shape. A thickness of the whole thick-wall portion 11 of the slide door 3a is substantially equal to a width of a guide groove 12 described later (see FIG. 5). In FIG. 5, the numeral W1 designates the thickness of the thick-wall portion 11, and the numeral W2 designates the width of the guide groove 12 (W1=W2). The same holds true for all the thick-wall portions 11 in the protrusions 10a, 10b, and 10c.

However, in the protrusion 10c, because the lower end edge 3b' (see FIG. 3(B)) of the grip 3b is also used as a sliding door supporting protrusion, the semi-circular protrusion is not formed in the outer surface of the slide door main body 3a, although the thick-wall portion 11 is formed.

Referring to FIG. 3, the numeral 13 designates a protrusion that is formed in the inner and outer surfaces of the slide door main body 3a in a neighborhood of an upper end edge of the slide door main body 3a. The protrusions 13 in FIG. 3 have the configuration similar to that of the protrusion 10. The numeral 14 designates a thick-wall portion that is formed in the inner and outer surfaces of the slide door main body 3a while coupled to the protrusion 13. As with the thick-wall portion 11, a thickness of the whole thick-wall portion 14 is substantially equal to a width of a guide groove (not illustrated) formed in the upper frame member 7.

Figure 6:
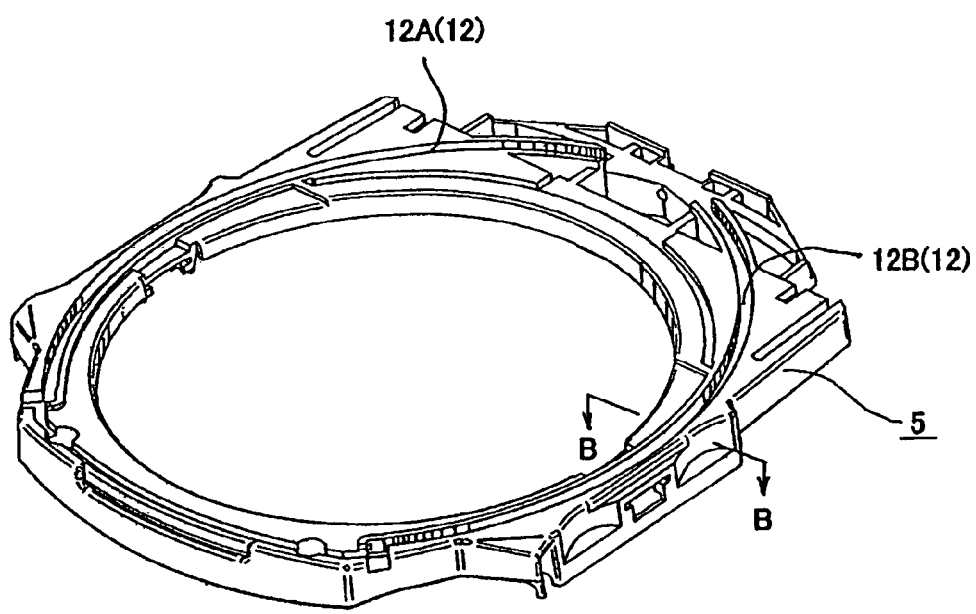
FIG. 6 is a perspective view illustrating a lower frame member constituting a guide groove of the slide door.

FIG. 6 illustrates the windshield lower frame member 5 having the guide groove for the slide door 3. The guide grooves 12 are formed at two points with respect to the lower frame member 5, the right slide door 3A of FIG. 1 is engaged with the guide groove 12A, and the left slide door 3B is engaged with the guide groove 12B. Although not illustrated, the guide grooves corresponding to the right and left guide grooves 12A and 12B are formed with respect to the upper frame member 7, and the right and left slide doors 3A and 3B are opened and closed by being guided by the guide grooves of the upper and lower frame members 7 and 5.

The engagement state between the slide door 3 and the guide groove 12 and the opened and closed states of the slide door 3 will specifically be described with reference to FIGS. 4 to 7. FIG. 5 is a sectional view illustrating the slide door 3 and the guide groove 12 when the slide door lower portion of FIG. 4 is located in the guide groove 12 (12B) of FIG. 6, and the sectional view of FIG. 5 corresponds to the section of the protrusion taken on a line A-A of FIG. 4 and the section of the guide groove 12 taken on a line B-B of FIG. 6.

In FIG. 5, a position in which the protrusion 10 is formed, more specifically a height from the slide door lower end edge 3a' in the backside (slide surface) of the protrusion 10 is slightly lower than a depth of the guide groove 12. Therefore, when the slide door 3 is placed in the guide groove 12, a space having a height H1 is formed between the lower end edge 3a' of the slide door 3 and the bottom surface 12a of the guide groove 12 while the backside of the protrusion 10 is engaged with an upper end face 12b of the frame forming the guide groove 12. That is, each protrusion 10 supports the weight of the slide door 3, and slides on the upper face 12b of the frame forming the guide groove 12, thereby opening and closing the slide door 3.

Figure 7:
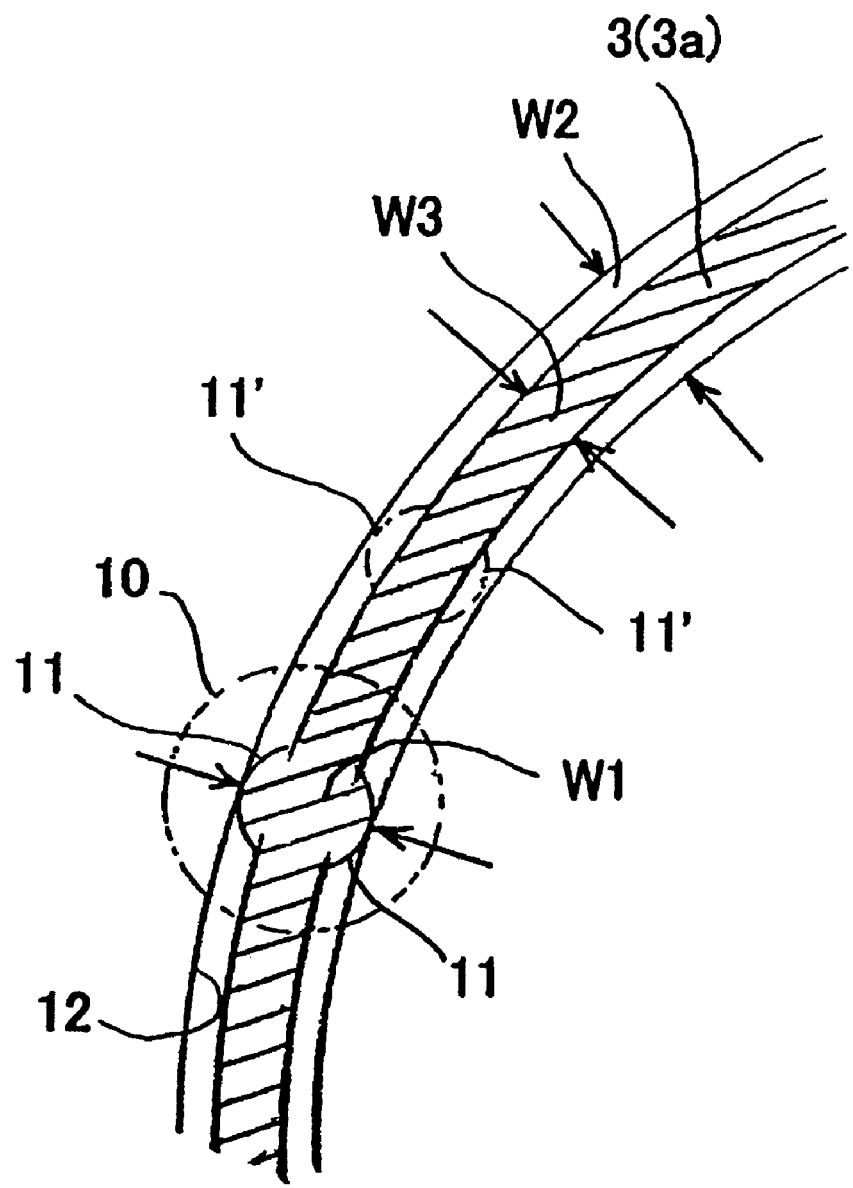
FIG. 7 is a sectional view illustrating a relationship between the slide door and the guide groove when the slide door in the guide groove is horizontally cut.
Figure 8:
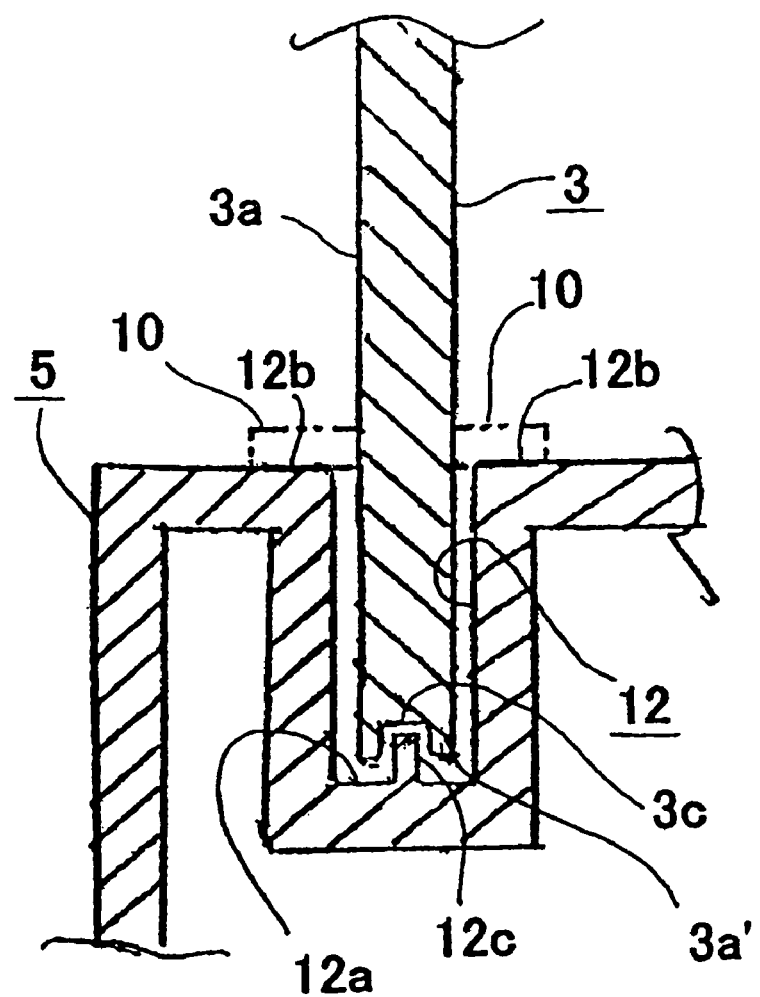
FIG. 8 is a sectional view illustrating a slide door and a guide groove according to another embodiment of the invention.

As illustrated in FIG. 5, because a wall thickness W3 of the slide door 3 is smaller than the width W2 of the guide groove 12, a given gap is formed between the sidewall of the guide groove 12 and the slide door 3 (see FIG. 7 and FIG. 8 illustrating another embodiment). On the other hand, below the protrusion 10, the thick-wall portion 11 is formed so as to be projected from the inner and outer surfaces of the slide door 3, and the thickness W1 of the thick-wall portion 11 is substantially equal to the width W2 of the guide groove 12. Therefore, the thick-wall portion 11 is closely located so as to come into line contact with the guide groove 12 in the depth direction of the sidewall of the guide groove 12.

In the above-described configuration, each protrusion 10 is slid on the upper face 12b of the frame forming the guide groove 12, thereby opening and closing the slide door 3. Because the given gap is formed between the slide door 3 and the sidewall of the guide groove 12, even if the guide groove 12 and the slide door 3 have comparatively low roundness, the gap becomes a clearance to prevent the contact between the slide door 3 and the sidewall of the guide groove 12. Therefore, the slide door can extremely lightly and smoothly be opened and closed. The lightness of the slide door during the opening and closing will specifically be described. Only a little finger of a hand is laid to the grip 3b of the slide door 3 to lightly push the grip 3b, whereby the slide door 3 can easily be opened. Therefore, for example, the slide door 3 can be opened and closed by the hand in which the sample is held, or the slide door 3 can be opened by the left hand to place the sample on the pan while a writing material is held in the right hand.

Because the thick-wall portion 11 is formed, the thick-wall portion 11 of the slide door 3 is substantially in contact with the sidewall of the guide groove 12. Therefore, although the gap is formed between the guide groove 12 and the slide door 3, the thick-wall portions 11 exert the function of positioning the slide door 3 in the guide groove 12, which allows a rattle to be substantially completely prevented in opening and closing the slide door 3.

In the configuration of FIG. 5, the thick-wall portion 11 is formed immediately below the protrusion 10. However, it is not always necessary to form the thick-wall portion 11 immediately below the protrusion 10. For example, the thick-wall portion 11 may be formed in another position than the protrusion 10 as illustrated by the numeral 11' of FIG. 7.

The protrusions 10 and the thick-wall portions 11 are not symmetrically disposed in the surface and backside of the slide door 3, but the protrusions 10 and the thick-wall portions 11 may be disposed while offset from each other.

Second Embodiment

FIG. 8 illustrates a windshield for a weighing apparatus according to another embodiment of the invention.

In the windshield for a weighing apparatus of FIG. 8, a groove portion 3c whose opening end is orientated downward is formed in a central portion of the lower end edge 3a' of the slide door 3, and a rib 12c is formed in the center of the bottom surface 12a of the guide groove 12 so as to face the groove portion 3c. When a given gap is formed between the groove portion 3c and the rib 12c, the groove portion 3c and the rib 12c can be formed so as to have the comparatively low roundness. In the configuration of FIG. 8, a function as a labyrinth seal can further be enhanced because the section of the gap becomes complicated compared with that of the embodiment of FIG. 5.

The slide door sliding structure of the invention can be applied not only to the substantially cylindrical windshield but also to a windshield structure in which a flat slide door is linearly opened and closed.

In the embodiments, the slide door is integrally made of the synthetic resin. Alternatively, the slide door is made of glass, and the protrusion 10 and the thick-wall portion 11 (the upper protrusion 13 and thick-wall portion 14 as well) may be made of the synthetic resin and fitted in and fixed to a predetermined portion of the slide door. Sometimes the slide door is preferably made of glass as in the case where the sample which is a solvent for plastic is measured. Although the curved surface close to the perfect circle is hardly formed by the glass, the glass slide door can be formed so as to have the comparatively low roundness when the gap is formed between the slide door and the guide groove as described above. Accordingly, the practical use of the glass slide door is realized.

The invention claimed is:

1. A windshield for a weighing apparatus, comprising
a windshield main body having a frame in which is formed a guide groove, the windshield further comprising a slide door, a lower portion of the slide door being located in the guide groove and the slide door being opened and closed along the guide groove,
a plurality of protrusions projecting at a plurality of points in a vicinity of a lower end edge of the slide door,
the protrusions being engaging an upper end face of the frame to support a weight of the slide door, thereby forming a gap between a guide groove bottom surface and the slide door lower end edge,
a wall thickness of the slide door being formed smaller than a width of the guide groove to form a gap between the slide door and a guide groove sidewall, and
the protrusions being slid on the upper end face of the guide groove to open and close the slide door.

2. The windshield for a weighing apparatus according to claim 1, wherein thick-wall portions are formed in inner and outer surfaces of the slide door in a portion of the slide door located within the guide groove, and the thick-wall portion is formed with a thickness that is substantially equal to the width of the guide groove.

3. The windshield for a weighing apparatus according to claim 2, wherein the thick-wall portion is formed below the protrusions.

4. The windshield for a weighing apparatus according to claim 1, wherein the slide door and the guide groove guiding the slide door are formed into a curved surface such that projection planes of the slide door and guide groove are formed into an arc.

5. The windshield for a weighing apparatus according to claim 1, wherein a groove whose opening end is orientated downward is formed in the substantial center in a width direction of the slide door lower edge, and a rib is formed in the center of the guide groove bottom surface, the rib being received in the groove formed in the slide door lower edge with a predetermined clearance.

* * * * *